(12) United States Patent
Bethel et al.

(10) Patent No.: US 6,603,794 B2
(45) Date of Patent: Aug. 5, 2003

(54) SYSTEM AND METHOD FOR LASER BEAM COUPLING BETWEEN WAVEGUIDE AND OPTICS

(75) Inventors: Jason W. Bethel, Seattle, WA (US); Eugene F. Yelden, Mukilteo, WA (US); Alex B. Dexter, Lake Stevens, WA (US); Jeffery A. Broderick, Seattle, WA (US)

(73) Assignee: Synrad, Inc., mukilteo, WA (US)

( * ) Notice: Subject to any disclaimer, the term of this patent is extended or adjusted under 35 U.S.C. 154(b) by 0 days.

(21) Appl. No.: 09/948,054

(22) Filed: Sep. 5, 2001

(65) Prior Publication Data

US 2003/0048826 A1 Mar. 13, 2003

(51) Int. Cl.[7] .................................................. H01S 3/08
(52) U.S. Cl. .............................. 372/98; 372/55; 372/64
(58) Field of Search .............................. 372/55, 64, 98

(56) References Cited

U.S. PATENT DOCUMENTS

| 5,029,173 A | | 7/1991 | Seguin ........................ 372/23 |
| 5,216,689 A | * | 6/1993 | Gardner et al. ............... 372/87 |
| 5,892,782 A | | 4/1999 | Vitruk et al. ................. 372/19 |

* cited by examiner

Primary Examiner—Paul Ip
Assistant Examiner—Leith A Al-Nazer
(74) Attorney, Agent, or Firm—Davis Wright Tremaine LLP; George C. Rondeau, Jr.; Brian L. Johnson

(57) ABSTRACT

A system and method for laser beam coupling between waveguide optics uses extension members to reduce power losses in a laser beam traveling within a resonator cavity of the laser beam. In some embodiments, the extension members are made of electrically conducting material and are spaced from longitudinal ends of electrodes by electrically insulating material. The electrically insulating material is sized to prevent electrical discharge from occurring between the electrode and the extension member adjacent thereto. In other embodiments, the extension members are fashioned from a lasing medium such as from a solid-state crystal lasing medium.

28 Claims, 15 Drawing Sheets

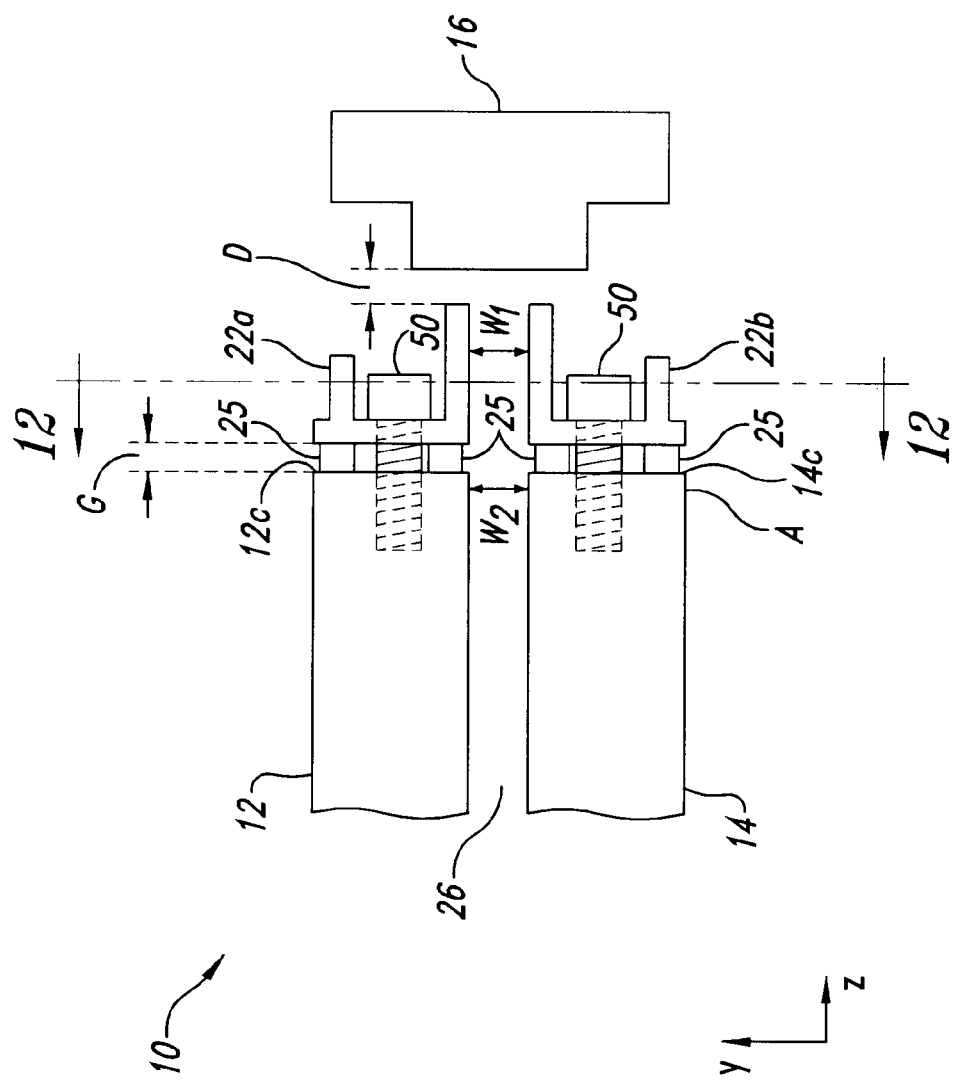

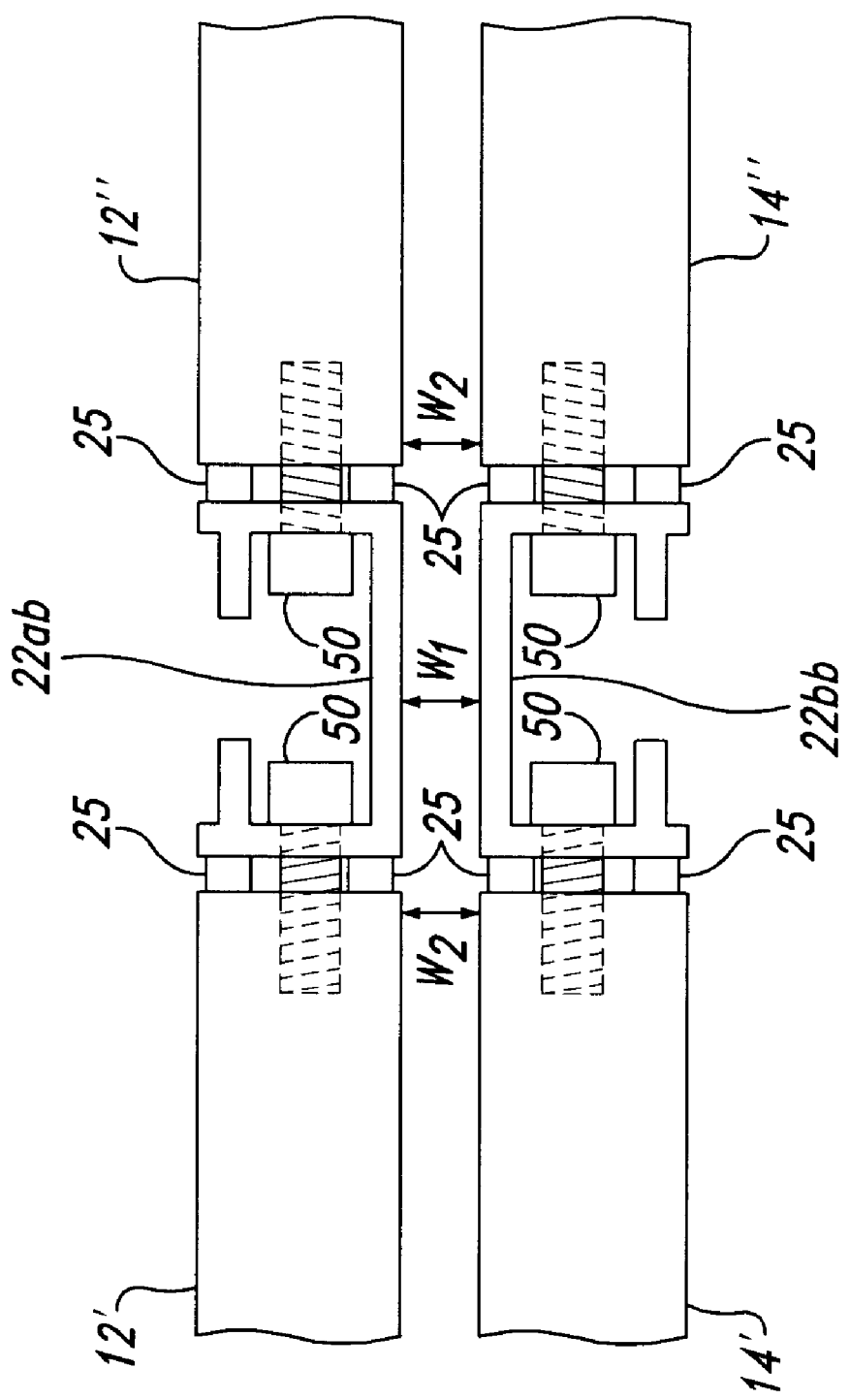

SYSTEM AND METHOD FOR LASER BEAM COUPLING BETWEEN WAVEGUIDE AND OPTICS

BACKGROUND OF THE INVENTION

1. Field of the Invention

The present invention relates generally to systems and methods for enhancing performance of lasers, and more particularly, for reducing power losses in laser beams internal to laser devices.

2. Description of the Related Art

There has been considerable recent interest in developing and improving the performance characteristics of lasers in general, and more specifically, gas lasers. Much of this interest has been prompted by the ever-growing acceptance of laser devices as everyday tools in the industrial workplace. Therefore, much of the attention to device improvement has centered on increased performance in terms of output power, power stability, reduced physical size, reduced cost and prolonged operational lifetime.

Particular efforts have been expended in the development of slab type gas lasers. These devices have one or more optical resonators each formed by a pair of optical mirrors that reflect a laser beam back and forth between each other. The laser beam originates in one or more discharge regions positioned between the optical mirrors. The devices are further characterized by their hybrid nature with the one or more discharge regions so shaped to be stable with a waveguiding influence on the laser beam in a first dimension and unstable with a freespace influence on the laser beam in a second dimension perpendicular to the first.

One performance robbing problem of waveguide lasers in general and slab lasers in particular is associated with non-discharge regions internal to the laser that are adjacent to the one or more discharge regions of the laser. In these non-discharge regions, the laser beam typically spreads out somewhat as it travels out of the waveguiding influence of a discharge region through the non-discharge region to a mirror and then back through the non-discharge region to the discharge region where it again experiences the waveguiding influence of the discharge region. In addition to non-discharge regions being positioned between a discharge region and an optical mirror element, conventional lasers also have non-discharge regions being positioned between two discharge regions when the conventional lasers have more than one discharge region.

As a result of traveling out of the waveguiding influence of the discharge region and back into the waveguiding influence of the same or another discharge region, the laser beam is not entirely coupled back into the discharge region. Since the laser beam is reflected back through the discharge and non-discharge regions many times before exiting the laser, a slight loss in coupling for a single transition between discharge and non-discharge regions results is significant cumulative losses. Unfortunately, in conventional lasers, the discharge regions must be kept far from the optical mirrors to avoid damage, thus, the non-discharge regions with their non-waveguiding influence tend to be significant in size.

Consequently, these non-discharge regions are typically associated with significant power loss due to the poor coupling of the optical radiation of the laser beams as they travel from the non-discharge regions back into the waveguides of the discharge regions. See, for example, D. R. Hall and C. A. Hill, "Radiofrequency-Discharge-Excited $CO_2$ Lasers", in *Handbook of Molecular Lasers*, edited by P. K. Cheo, Marcel Dekker, Inc., New York, N.Y., 1987, chapter 3, p.165–258, for a discussion of this phenomenon. A solution to this problem of laser beam power loss would be welcomed.

BRIEF SUMMARY OF THE INVENTION

The present invention resides in a system and method for laser beam coupling. Aspects of the system and method involve a laser having first and second electrodes extending in a longitudinal direction and each having opposing first and second longitudinal ends. At least portions of the first and second electrodes are separated from each other in a separation direction transverse to the longitudinal direction by a separation distance associated with a Fresnel number of no more than 0.75. A gaseous lasing medium is disposed between the first and second electrodes at an operating pressure. The gaseous lasing medium is configured to form laser energy when excited by excitation energy from an energy source transmitted through the first and second electrodes.

Aspects further include first and second mirrors. The first mirror is positioned adjacent to the first longitudinal ends of the first and second electrodes and the second mirror is positioned adjacent to the second longitudinal ends of the first and second electrodes. The first and second mirrors have surfaces configured to form the laser energy into a laser beam that extends between the first and second mirrors. A plurality of electrical insulators comprise one or more solid materials.

Additional aspects include first and second waveguide extensions. The first waveguide extension is positioned at the first longitudinal ends of the first and second electrodes with at least one of the electrical insulators therebetween and extending in the longitudinal direction toward the first mirror. The second waveguide extension is positioned at the second longitudinal ends of the first and second electrodes with at least one of the electrical insulators therebetween and extending in the longitudinal direction toward the second mirror. The first and second waveguide extensions are electrically conducting.

Each of the first and second waveguide extensions have opposing surfaces separated from each other along the separation direction by substantially the separation distance. The electrical insulators are sized to prevent electrical discharge from occurring between the first electrode and the first waveguide extension, between the first electrode and the second waveguide extension, between the second electrode and the first waveguide extension, between the second electrode and the second waveguide extension, between the opposing surfaces of the first waveguide extension, and between the opposing surfaces of the second waveguide extension at the operating pressure of the gaseous lasing medium.

Other features and advantages of the invention will become apparent from the following detailed description, taken in conjunction with the accompanying drawings.

BRIEF DESCRIPTION OF THE DRAWINGS

FIG. 1A is an enlarged, fragmentary side view of a section of the laser embodiment shown in FIG. 1.

FIG. 3A is a close-up view of a portion of FIG. 3 illustrating an interface between two sets of electrode pairs.

DETAILED DESCRIPTION OF THE INVENTION

Figure 1:
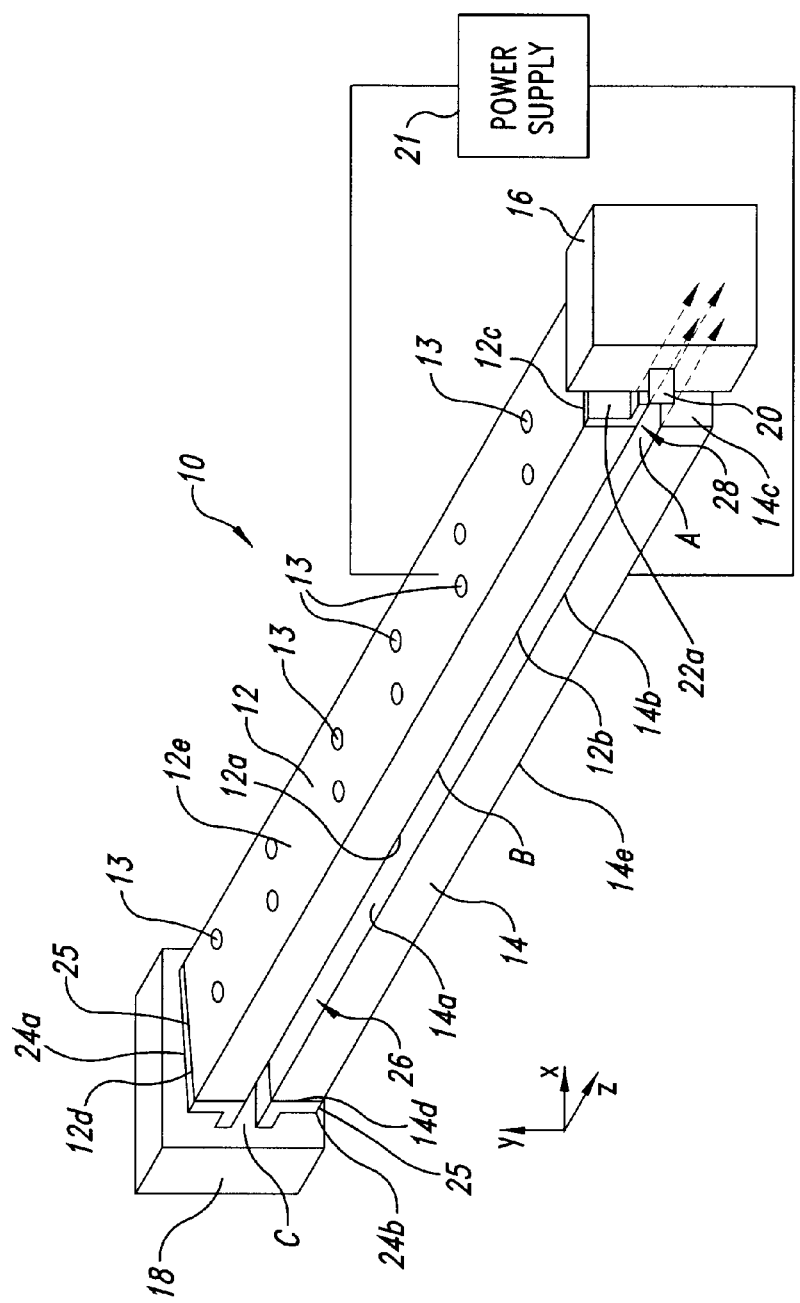
FIG. 1 is an isometric drawing of a slab laser utilizing an embodiment of the present invention.

In accordance with the present invention a laser is provided to enhance performance and in particular, to reduce the losses in beam power associated with coupling between waveguide discharge regions and optical elements or between two discharge regions. Embodiments of the present invention include lasers with a gain medium that may be, for example, a solid-state laser crystal or a gas mixture of appropriate constituents. The gain medium is excited in a fashion consistent with common practice to induce a population inversion conducive to laser action. This excitation may involve optical pumping via flashlamps or laser diodes for solid-state lasers, and typically direct pumping through electrode structures for gas lasers. Also included is an optical resonator having at least two optical elements with totally or partially reflecting surfaces. At least one optical element is placed at each of the opposite ends of the gain medium to define a resonant cavity for the optical radiation generated in the gain medium. Many of the embodiments using a gaseous gain medium include a suitable vacuum enclosure or other such appropriate housing. Some form of cooling of the gain medium is generally provided such as based on flow of liquids or gases through the laser structure or based on other mechanisms utilizing thermal convection, conduction, or radiation.

In embodiments of the invention using gas lasers, the electrode spacing is such that the optical radiation propagates in substantially a waveguide manner within at least one dimension of the resonator structure. As understood in the art, waveguiding occurs when $\pi N \leq 1$, where N is the Fresnel number of the electrode structure. (D. R. Hall and C. A. Hill, "Radiofrequency-Discharge-Excited $CO_2$ Lasers", in *Handbook of Molecular Lasers*, edited by P. K. Cheo, Marcel Dekker, Inc., New York, N.Y., 1987, chapter 3, p.165–258.) So called hybrid structures, having a Fresnel number ranging from 0.3 up to approximately 0.75 may also be used, although physical size constraints and construction methods may make these devices impractical to realize. Gas laser embodiments include electrodes having lengths of up to 1 meter, widths of up to 0.5 meters and inter-electrode gaps on the order of 1–5 mm. Another criterion of note is related to the aspect ratio of the length to width of the electrode being on the order of 5:1–20:1. Other embodiments use actual inter-electrode gap sizes and lengths of the electrodes that are varied but still provide structures that fall within the above specified Fresnel number range.

Conventional waveguide lasers suffer losses in power of the laser beam because they locate significantly sized non-discharge regions having non-waveguiding influence on the laser beam adjacent to the discharge regions having waveguiding influence on the laser beam. Coupling losses result from the laser beam traveling back and forth between the non-discharge regions and the discharge regions, whereby the laser beam transitions between non-waveguiding and waveguiding influences.

To address this problem of coupling losses, the present invention provides for a system and method to provide non-discharge regions having waveguiding influence on the laser beam adjacent to the discharge regions to significantly reduce losses in power of the laser beam. These waveguiding non-discharge regions are so sized and positioned to extend waveguiding of the laser beam from a discharge region to within a significantly close proximity of the optical mirrors or another discharge region. As a result, only relatively small and insignificant non-waveguiding non-discharge regions exist in the lasers of the present invention compared with conventional lasers, thereby significantly reducing power losses of the laser beam compared with conventional systems.

The advanced approaches found in the system and method of the present invention allows for the use of relatively inexpensive materials and methods of manufacture of the waveguide extension members defining the waveguiding non-discharge regions, which further encourages use of the present invention to reduce losses in power of the laser beam. These waveguide extension members of the present invention may appear counterintuitive to the design philosophies of conventional laser devices since the materials used for the waveguide extension members of the present invention may first appear to risk extending the discharge regions closer to the optical mirrors rather than defining non-discharge regions.

In particular, metals, such as steel, aluminum and other metallic alloys, and other electrical conductive materials are used in the present invention for a substantial portion of the waveguide extension members. As described in further detail for embodiments below, electrical insulators are used to form an anti-breakdown gap between an electrode and a waveguide extension member or another electrode. The anti-breakdown gap provided by the electrical insulators allow for use of metallic waveguide extension members without discharge occurring between an electrode and a waveguide extension members or another electrode. Although the results of the present invention are welcomed, they are not self-evident since conventional wisdom would incorrectly teach that the discharge regions would be consequently extended toward the optical mirrors thereby causing damage to the mirrors.

In addition to lower costs involved, the use of waveguide extension members made from metals, such as aluminum, offer performance enhancement compared with waveguide extension members made from more expensive materials such as ceramics. Use of ceramics to make the waveguide extension members would result in additional loss of power of the laser beam compared with use of metals, such as aluminum, since in general, laser beams undesirably interact with ceramic materials when the ceramic materials are used as waveguides for the laser beams. Therefore, the present invention uses metallic waveguide extension members to extend waveguides of discharge regions defined by pairs of electrodes confining a gaseous gain medium, or defined by shaped solid gain media, to guide laser beams under waveguiding influences substantially the entire distance from the ends of the gain media to very near the optical surface of the optical mirrors as further discussed below. The waveguide extension members are shaped to extend the waveguide found in the discharge region. For instance, if the waveguide has planar surfaces opposingly spaced apart a particular distance then the waveguide extension members will also have planar surfaces opposingly spaced apart the same particular distance to continue waveguiding a laser beam.

As shown in the drawings for purposes of illustration, the present invention is embodied in FIG. 1 as a narrow gap, or slab, gas laser with a cooling system, with the slab laser generally indicated by reference 10. The depicted embodiment of the slab laser 10 includes first and second elongated planar electrodes 12 and 14 parallel to each other and extending between a front resonator mirror 16 and a rear resonator mirror 18. For the depicted embodiment, the first and second electrodes 12 and 14 are 30 mm in total width along a transverse x-axis, and are approximately 433.4 mm in total length along a longitudinal z-axis, and have an inter-electrode gap with a slight bow that varies from 1.5 mm along a vertical y-axis at points A at the front surfaces 12c and 14c nearest the front resonator mirror 16 and C at the rear surfaces 12d and 14d nearest the front and rear resonator mirrors 16 and 18, respectively, and 1.25 mm at point B centrally located along the z-axis between points A and C. Other embodiments do not incorporate bowed electrodes into their designs.

In the depicted embodiment, besides the slight bow in the inter-electrode gap mentioned above, the first and second electrodes 12 and 14 have opposing inner surfaces 12a and 14a, respectively, that are substantially planar and parallel with each other except for a strip portion (not shown) on each surface with a width extending in the x-axis direction 3 mm in from edges 12b and 14b and running along the z-axis causing a slight taper in the inter-electrode gap in this strip portion to compensate for asymmetrical divergence in the x-axis and y-axis of laser beam 20. Other embodiments do not include this taper strip portion of the inter-electrode gap.

Positioned between a front surface 12c of a longitudinal end of the first electrode 12 and the front resonator mirror 16 is a first waveguide front extension member 22a, and between a front surface 14c of a longitudinal end of the second electrode 14 and the front resonator mirror 16 is a second waveguide front extension member 22b, as best illustrated in FIG. 1A. The first and second waveguide front extension members 22a and 22b have planar surfaces opposingly spaced apart a distance, W1, approximately equal to the spacing distance, W2, between the inner surface 12a of the first electrode 12 and the inner surface 14a of the second electrode 14 as shown in FIG. 1A. Positioned between a rear surface 12d of a longitudinal end of the first electrode 12 and the rear resonator mirror 18 is a first waveguide rear extension member 24a, and between a rear surface 14d of a longitudinal end of the second electrode 14 and the rear resonator mirror 18 is a second waveguide rear extension member 24b, constructed much the same as the front extension members shown in FIG. 1A. An electrical insulator 25 is positioned between the first waveguide front extension member 22a and the front surface 12c of the first electrode 12, between the second waveguide front extension member 22b and the front surface 14c of the second electrode 14, the first waveguide rear extension member 24a and the rear surface 12d of the first slab electrode 12, and between the second waveguide rear extension member 24b and the rear surface 14d of the second slab electrode 14.

A gas lasing medium is positioned within an optical resonator cavity 26 formed between the resonator mirrors 16 and 18. A pair of cylindrical optical elements are used for the front and rear mirrors 16 and 18 and are concave-concave optical elements with respect to the x-axis to form a negative branch unstable resonator and are plano-plano optical elements with respect to the y-axis to form a waveguide resonator. The radii of curvature with respect to the x-axis are 444 mm and 478 mm for the front and rear mirrors 16 and 18, respectively, and with respect to the y-axis are infinite for both the front and rear mirrors 16 and 18. With respect to both the x-axis and the y-axis, the optical path length is approximately 461.4 mm. Other embodiments may use cylindrical optics, spherical optics, toroidal optics, or generally aspherical optics, or any combinations thereof for the resonator. The optics are mounted to end flanges which contain provisions to maintain vacuum integrity whilst still providing suitable adjustment of the mirror tilt to enable optimum alignment of the resonator.

Figure 2:
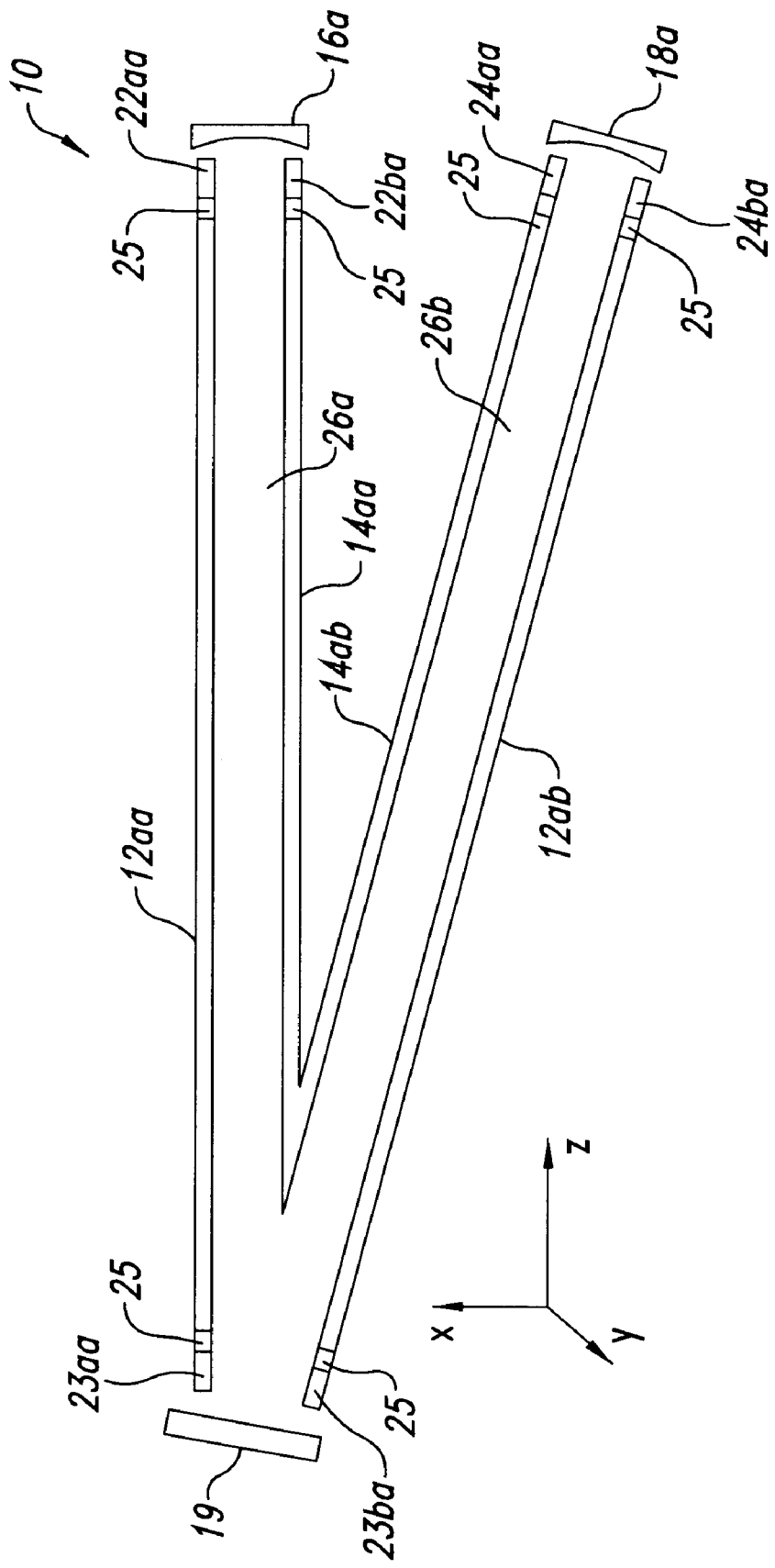
FIG. 2 is a schematic drawing of a slab laser utilizing a folded resonator embodiment of the present invention.

The resonator cavity 26 serves as a discharge area for the gas lasing medium. In the depicted embodiment, the resonator cavity is rectangularly shaped, however, alternative embodiments have square, annular, or other shaped resonator cavities, such as folded resonator cavities. The slab laser 10 can have a folded resonator such as shown in FIG. 2, which has a middle mirror 19 positioned between the front and rear mirrors 16a and 18a. Typical with folded cavities, there are multiple discharge sections 26a and 26b formed by electrodes 12aa, 12ab, 14aa, and 14ab, as shown in FIG. 2. Positioned between the discharge section 26a and the front mirror 16a are first and second front extension members 22aa and 22ba, between the discharge sections 26a and 26b and the middle mirror 19 are first and second middle extension members 23aa and 23ba, and between the discharge section 26b and the rear mirror 18a are first and second rear extension members 24aa and 24ba.

Figure 3:
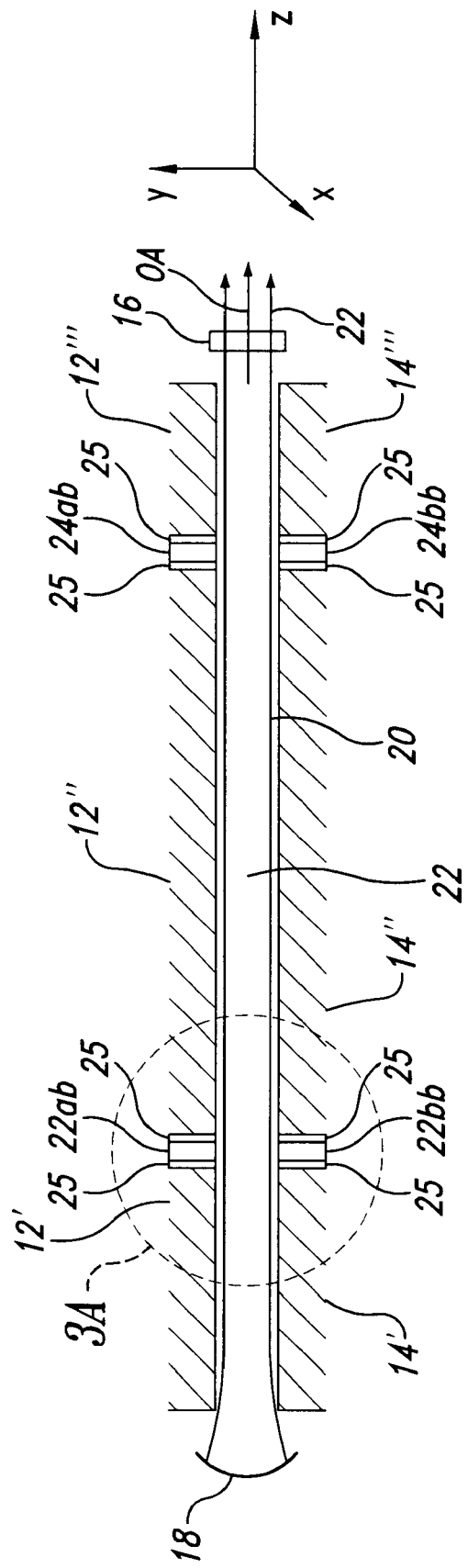
FIG. 3 is a longitudinal cross-sectional view of an alternative embodiment of the present invention illustrating use of multiple sets of electrode pairs.

Other embodiments include more than two resonator sections. For instance, some embodiments use more than one pair of electrodes with more than one associated discharge space such as first electrode pair 12' and 14'; second electrode pair 12" and 14"; and third electrode pair 2'" and 4'" shown in FIG. 3. A first pair of waveguide extension members 22ab and 22bb are positioned between the first electrode pair 12' and 14' and the second electrode pair 12" and 14". A second pair of waveguide extension members 24ab and 24bb are positioned between the second electrode pair 12" and 14" and the third electrode pair 2'" and 14'". A detailed view of an exemplary embodiment of the first pair of waveguide extension members 22ab and 22bb is shown in FIG. 3A. The first pair of waveguide extension members 22ab and 22bb are spaced apart the distance, W1, approximately equal to the spacing, W2, for the first electrode pair 12' and 14' and the second electrode pair 12" and 14". In the exemplary embodiment, the first pair of waveguide extension members 22ab and 22bb are attached to the first electrode pair 12' and 14' and the second electrode pair 12" and 14" by ceramic screws 50 and are spaced from the first electrode pair 12' and 14' and the second electrode pair 12" and 14" by the electrical insulator 25.

Figure 4:
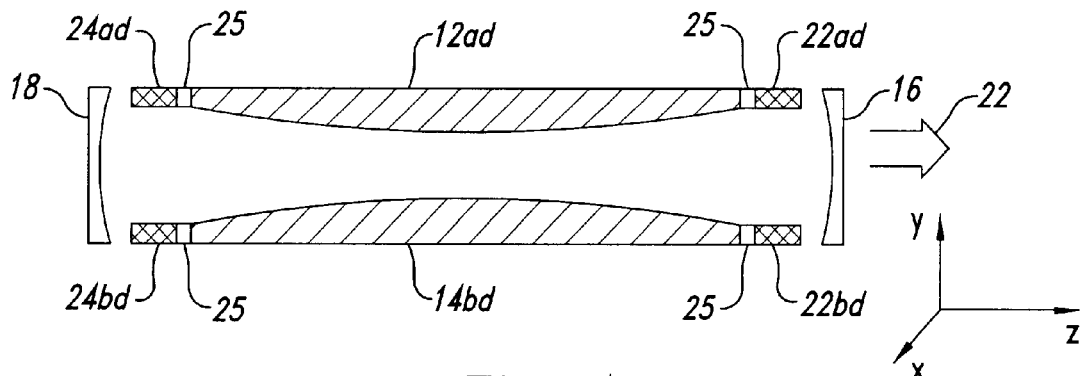
FIG. 4 is a longitudinal cross-sectional view of an alternative embodiment of the present invention illustrating use of contoured electrodes.

Other embodiments utilize contoured first and second electrodes 12ad and 14ad that are non-planar with respect to at least one dimension, for instance the longitudinal z-axis, as shown in FIG. 4. Here, front waveguide extension members 22ad and 22bd and rear waveguide extension members 24ad and 24bd are shaped to extend the contoured profile of the first and second electrodes 12ad and 14ad.

Figure 5:
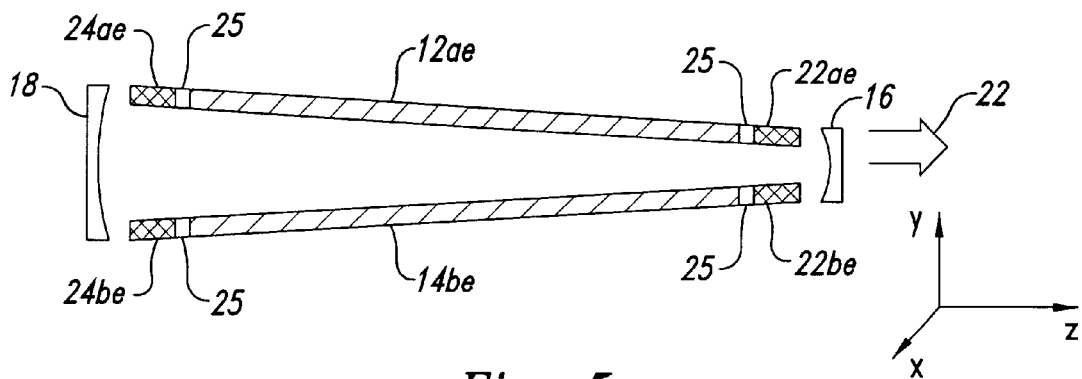
FIG. 5 is a longitudinal cross-sectional view of an alternative embodiment of the present invention illustrating use of tapered electrodes.

Further embodiments use electrodes that are inclined, diverging, tapered, or converging rather than parallel with respect to the longitudinal z-axis such as first and second electrodes 12ae and 14ae of FIG. 5 with front waveguide extension members 22ae and 22be and rear waveguide extension members 24ae and 24be shaped to extend the tapered profile of the first and second electrodes.

Figure 6:
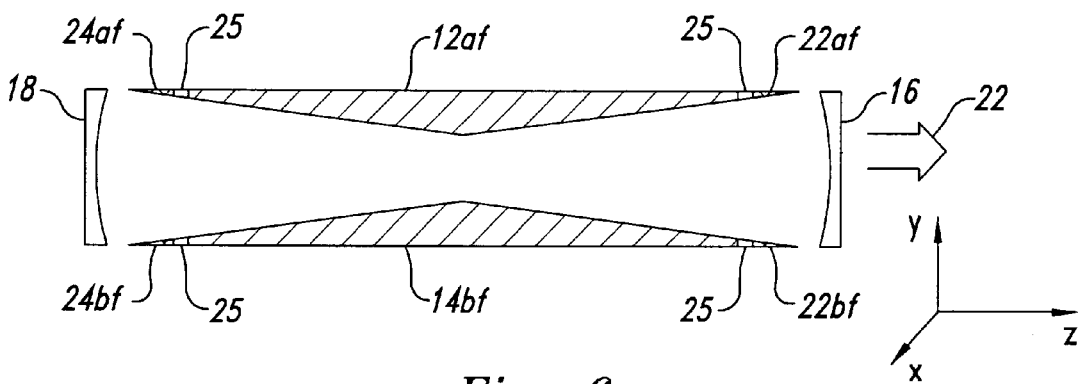
FIG. 6 is a longitudinal cross-sectional view of an alternative embodiment of the present invention illustrating use of triangularly tapered electrodes.

Triangularly tapered first and second electrodes 12af and 14af of FIG. 6 have front waveguide extension members 22af and 22bf and rear waveguide extension members 24af and 24bf shaped to extend the triangularly tapered profile of the first and second electrodes. Other configurations for electrodes are used as well with one or more waveguide extension members contoured along a transverse axis such as the x-axis to conform with other tapered shapes of the electrodes or solid-state gain media.

For an exemplary embodiment, the gas lasing medium is a standard mixture of one part carbon dioxide ($CO_2$), one part nitrogen ($N_2$), and three parts helium (He), with the addition of 5% xenon (Xe). The gas pressure is maintained between at least 30 and at least 150 Torr with 90 Torr being used for the exemplary embodiment. Other embodiments use higher pressures. Alternative embodiments of the invention can use other types of gas lasers, examples of which are listed in Table 1.

TABLE 1

TABLE FOR LASER GASES

| Laser | Gases |
|---|---|
| Carbon Dioxide | Some mixture of including He: $N_2$, $CO_2$, Xe |
| Carbon Monoxide | Some mixture of including He: $N_2$, $CO_2$, Xe |
| Helium Cadmium | Some mixture of including He: Cd, including other inert gases |
| HeNe Lasers | Some mixture of He, Ne. including other inert gases |
| Krypton Ion Lasers | Some mixture of Kr, He, including other inert gases |
| Argon Ion Lasers | Some mixture of Ar, He. including other inert gases |
| Xenon | Xe, including other inert gases |
| Argon Xenon Lasers | Some mixture of Ar, Xe, He |
| Copper Vapor Laser | He/Ne + copper vapor (metal at high temp) + traces of other gases including $H_2$ |
| Barium Vapor Laser | He/Ne + Barium vapor |
| Strontium Vapor Laser | He/Ne + Strontium vapor |
| Metal Vapor Laser | Almost any metal vapor will lase given the right mixture of gases, temperature, and excitation conditions |
| Metal Halide Vapor Lasers | Almost all the above metals will also lase in their respective halide compounds, at lower temperatures, under slightly different excitation conditions |
| Excimer lasers | XeCl, XeF, ArF |
| Chemical lasers | HF, DF |
| Atmospheric lasers | Atmospheric gas |
| Nitrogen lasers | $N_2$, plus others |
| Sulphur, Silicon | Vapors of these elements |
| Iodine, Bromine, Chlorine | Vapors of these elements |
| COIL | Chemical Oxygen Iodine Laser |

Other gas mixtures can be used as well. For instance, some embodiments may use other gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases, examples of which are listed in Table 1, at various other gas pressures such as at least 30 to at least 120 Torr including, in particular, 50 Torr; however, it will be appreciated that other gaseous lasing medium could also be employed. For instance, an alternative embodiment lasing medium could comprise one or more of the following vapors: copper, gold, strontium, barium, a halide compound of copper, a halide compound of gold, a halide compound of strontium, a halide compound of barium, and other vapors, examples of which are identified in Table 1.

The slab laser 10 of FIG. 1 includes a power supply 21 that applies excitation energy via the first and second electrodes 12 and 14 to the gas lasing medium, which causes the gas lasing medium to emit laser energy. Included with the power supply 21 is a radio frequency generator that applies excitation energy to the gas lasing medium via a matching network directly to the first and second electrodes 12 and 14. The radio frequency generator operates at a frequency of 81 MHz with an output power level of at least 600 W. Other embodiments may use other excitation frequencies and power levels. The radio frequency generator is connected to the electrodes in a biphase fashion such that the phase of the voltage on one of the first and second electrodes 12 and 14 is shifted substantially 180 degrees relative to the voltage on the other of the first and second electrodes 12 and 14. This is accomplished by the placement of inductors between the first and second electrodes.

The excitation energy supplied by the power supply 21 in the depicted embodiment of FIG. 1 has an associated RF voltage, but may also be associated with microwave, pulsed, continuous wave, direct current, or any other energy source that suitably stimulates the lasing medium into producing laser energy. Alternative embodiments utilize other forms of excitation including optically pumped solid-state lasers or utilize energy sources based upon solar energy, nuclear energy, or chemical energy. When the RF voltage is applied to the gas lasing medium via the first and second electrodes 12 and 14, a gas discharge forms within the resonator cavity 26 between the front and rear mirrors 16 and 18. The front and rear mirrors 16 and 18 form the laser energy into the laser beam 20 that travels back and forth in a longitudinal direction along the z-axis as shown in FIG. 1.

In the slab laser 10, the front and rear mirrors 16 and 18 are shaped and positioned to form an unstable resonator along the x-axis of FIG. 1 with an exit aperture 28 such that the laser beam 20 travels laterally until the laser beam exits the resonator cavity 26 via the exit aperture. The slab laser 10 is referred to as having an unstable resonator even though its resonator is stable along the y-axis of FIG. 1 since its resonator is unstable along the x-axis. The slab laser 10 is alternatively referred to as a hybrid stable-unstable resonator since it is stable with respect to one axis and unstable with respect to another axis. The first and second electrodes 12 and 14 are positioned sufficiently close to each other so that the resonator cavity 26 acts as a waveguide along the y-axis.

Figure 7A:
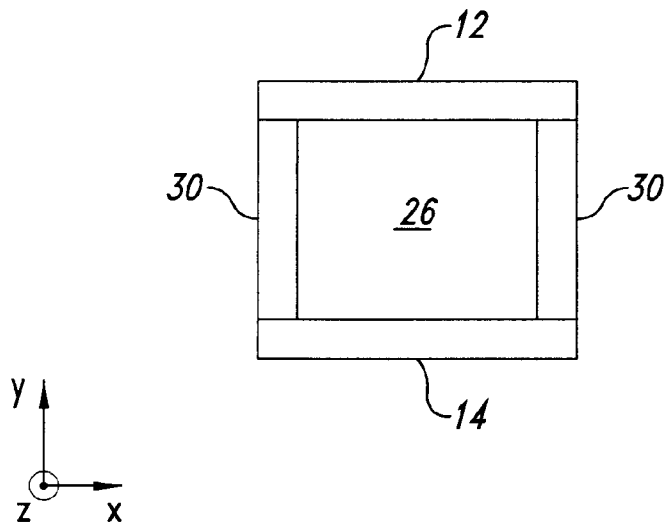
FIG. 7A is a cross-sectional view of a portion of a laser utilizing an embodiment of the present invention to provide laser beam waveguiding in two dimensions.
Figure 7B:
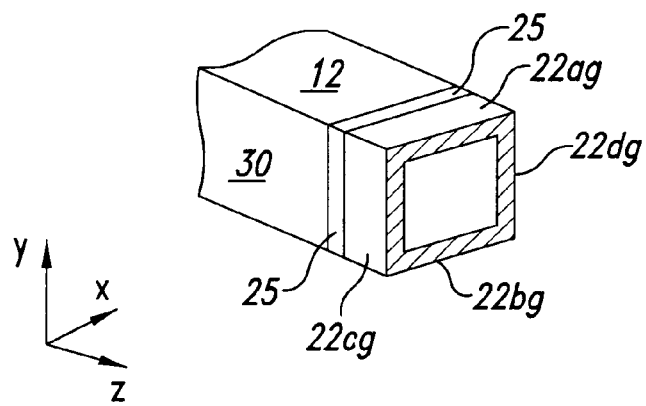
FIG. 7B is an isometric drawing of the two dimensional waveguiding embodiment of FIG. 7A showing a front waveguide extension member.

The first and second electrodes 12 and 14 are sufficiently wide and the resonator cavity 26 has little if any sidewalls so that the laser beam 20 has free space propagation with respect to the x-axis. In other embodiments the resonator 26 has a waveguide along the x-axis as well as the y-axis as shown by a cross-sectional view of one such embodiment in FIGS. 7A and 7B having side walls 30 to electrically insulate the first and second electrodes 12 and 14 and front waveguide extension members 22ag, 22bg, 22cg and 22dg separated from the first and second electrodes 12 and 14 and the side walls 30 by the insulator 25.

Figure 8A:
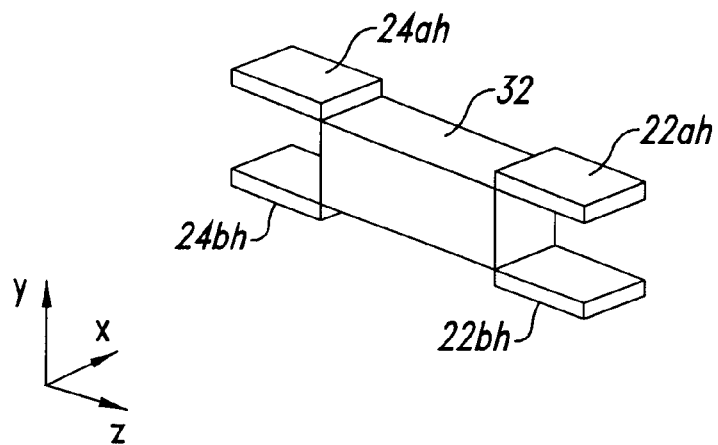
FIG. 8A is an isometric drawing illustrating a portion of a laser utilizing an embodiment of the present invention with a solid-state gain media.

A solid-state embodiment, illustrated in FIG. 8A, has front extension members 22ah and 22bh and rear extension members 24ah and 24bh extending from a solid-state gain medium 32.

Figure 8B:
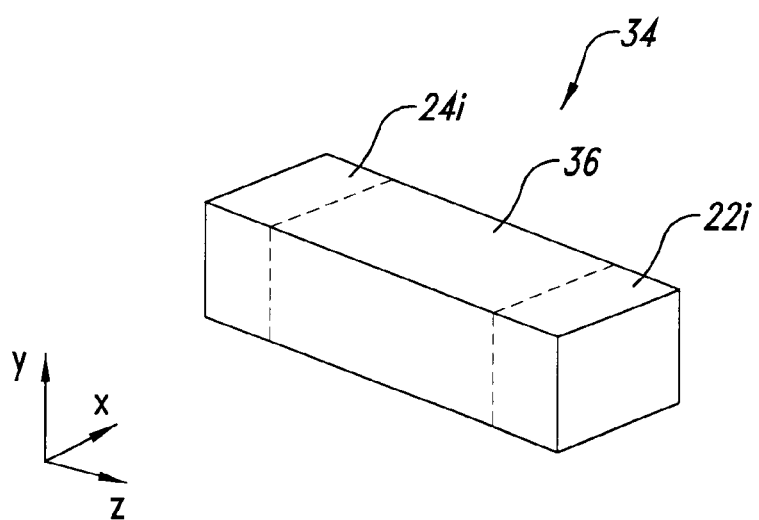
FIG. 8B is an isometric drawing illustrating a portion of a laser utilizing an alternative embodiment of the present invention with a solid-state gain media.

Another solid-state embodiment, shown in FIG. 8B, has a solid-state crystal 34 with a gain media portion 36 and front and rear extension portions 22i and 24i, respectively, that are all formed as part of the solid-state crystal. The gain media portion 36 of the solid-state crystal 34 is the only portion of the solid-state crystal that is excited such as through optical pumping via flashlamps or laser diodes. The front and rear extension portions 22i and 24i have the same thickness with respect to the y-axis as the gain media portion 36. Consequently, the front and rear extension portions 22i and 24i act as waveguide extension members to reduce power losses of the beam as it travels between the gain media portion 36 and front and rear mirrors.

Figure 9:
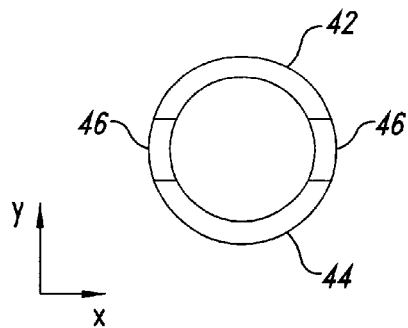
FIG. 9 is a cross-sectional view of a portion of a laser utilizing an embodiment of the present invention having annular electrodes.
Figure 10:
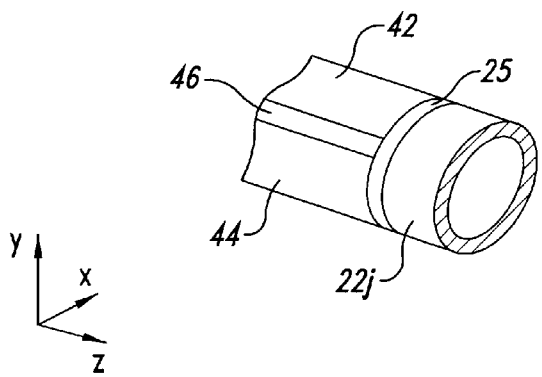
FIG. 10 is an isometric drawing of the annular electrode embodiment shown in FIG. 9.

Further embodiments have resonators with circular cross-sections such as shown in FIGS. 9A and 9B with a front waveguide extension member 22j separated by the electrical insulator 25 from first and second annular electrodes 42 and 44. The first and second electrodes 42 and 44 are electrically insulated from each other by longitudinally extending side walls 46.

Figure 11:
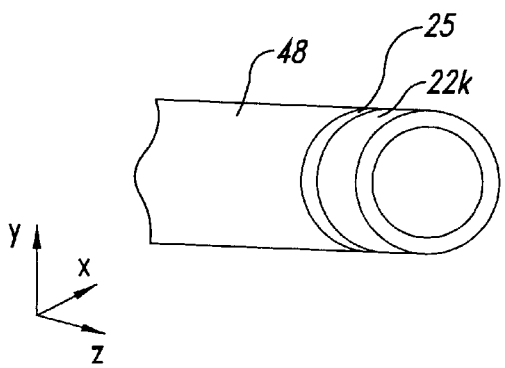
FIG. 11 is an isometric drawing of an embodiment of the present invention having a tubular waveguide with circular cross-section.

FIG. 11 illustrates a tubular waveguide 48 having a circular cross-section with respect to the x-axis and the y-axis with a front waveguide extension member 22k separated by the electrical insulator 25.

As noted previously, the laser beam 20 produced by the slab laser 10 of FIG. 1 exits the resonator cavity 26 via the exit aperture 28. Approximately ten percent of the light within the resonator cavity 26 goes through the exit aperture 28 by passing unencumbered beyond an edge of the front mirror 16 and through a ZnSe output window. In the depicted embodiment, the front and rear mirrors 16 and 18 have opposing concave reflective surfaces. The front and rear mirrors 16 and 18 are also confocal, i.e., have a common focal point. The exit aperture 28 is formed between the electrodes 12 and 14 by extending the rear mirror 18 laterally beyond an edge of the front mirror 16 (along the x-axis of FIG. 1) so that the laser beam 20 is reflected by the rear mirror 18 out of the resonator cavity 26 through the exit aperture 28. The front mirror 16 and rear mirror 18 in the depicted embodiment are totally reflecting, but in other embodiments the mirrors are partially reflecting and partially transparent.

The first and second electrodes 12 and 14 and the front and rear mirrors 16 and 18 of the embodiment of FIG. 1 are mounted in an aluminum housing (not shown) to provide vacuum integrity as well as shielding for the RF radiation. In order for the slab laser 10 to operate efficiently at higher powers, the aluminum housing is fitted with cooling fins or water channels to sufficiently dissipate the heat. Alumina ceramic spacer pills 13 of FIG. 1, which account for less than 5% of the total electrode surface area, are placed between exterior surfaces 12e and 14e of the first and second electrodes 12 and 14, respectively, and interior surfaces of the aluminum housing to provide electrical insulation between the electrodes and the housing. Other embodiments cover significantly more electrode surface area with ceramic such as 60% of the surface area. Once end caps and optic assemblies containing the front and rear resonator mirrors 16 and 18 are attached to the aluminum housing, the housing is evacuated and then a lasing gas mixture is introduced into the housing.

Figure 12:
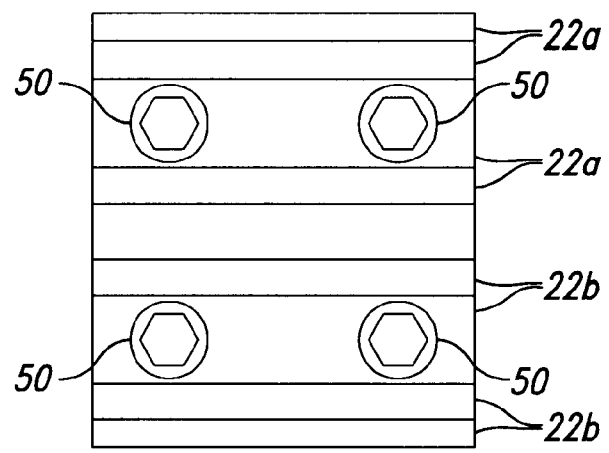
FIG. 12 is an end cross-sectional view of the section of the laser embodiment shown in FIG. 1A.

A pair of ceramic screws 50 are used to secure each of the front waveguide extension members 22a and 22b to the first and second electrodes 12 and 14, respectively, as shown in FIGS. 1A and 12. The ceramic screws 50 may be made of any suitable electrically insulating ceramic material, which may include portions of, but not limited to, the ceramic compounds listed in Table 2. In other embodiments, the front waveguide extension members 22a and 22b may be secured to the first and second electrodes 12 and 14, respectively, by screws made of electrically insulating materials other than ceramic, examples of which are given in Table 2.

TABLE 2

FASTENERS

| Fastener | Material | Description |
| --- | --- | --- |
| 1. Screw | Ceramic: Barium Boride, Boron Nitride, Titanium Oxide, Calcium Boride, Chromium Nitride, Zirconium Oxide, Titanium Diboride, Silicon | Electrically insulating screw, i.e., any non-metallic solid with suitable RF properties. |

TABLE 2-continued

FASTENERS

| Fastener | Material | Description |
| --- | --- | --- |
| | Nitride, Chromium Carbide, Aluminum Oxide, Titanium Carbide, Magnesium Oxide, Silicon Carbide, Silicon Oxide Plastic: Teflon (Polytetrafluoroethylene), Plexiglass (Polycarbonate), HDPE (High Density Polyethylene), Nylon (Polyamide), Delrin (Polyoxymethylene), Torlon (Polyamide-imide) Glass: Quartz, Pyrex, (Borosilicate, Silica, Soda Lime, Alkali Barium, Potash Soda Lead), Borosilicate | |
| 2. Clamp | See electrically insulating materials used for screw | The clamp is the electrical insulator, and the screw can be conducting or non-conducting. The clamp holds the bore extender in place and is screwed into the electrode. |
| 3. Direct Fixture to Single Electrode | | The bore extender can be screwed into the bottom electrode with any conducting or non-conducting screw, as long as the bottom electrode is grounded and a small gap between the top electrode and the bore extender is maintained. |

Figure 13:
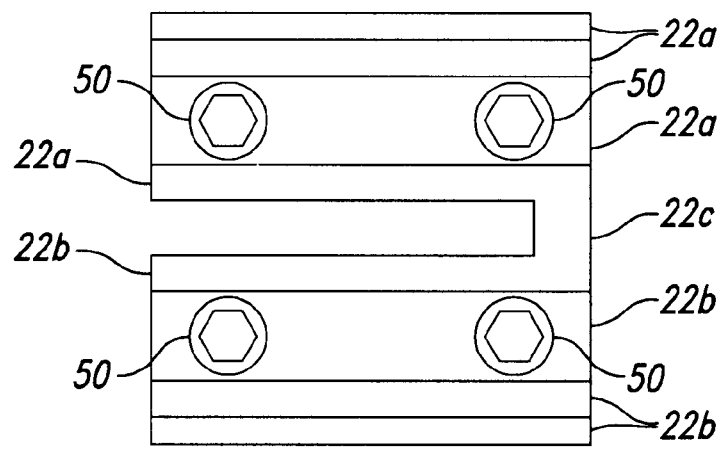
FIG. 13 is an end cross-sectional end view showing an embodiment of the waveguide extension member alternative to the waveguide extension members shown in FIG. 12.

The rear waveguide extension members 24a and 24b are similarly secured to the first and second electrodes, respectively. Each of the front waveguide extension members 22a and 22b and the rear waveguide extension members 24a and 24b are spaced with an anti-breakdown gap, G, (shown in FIG. 1A) of 0.38 mm along the z-axis forward from the first and second electrodes 12 and 14, respectively, and the rear waveguide extension members 24a and 24b are spaced 0.38 mm along the z-axis rearward from the first and second electrodes, respectively. In the exemplary embodiment, the electrical insulators 25 are small alumina ceramic spacer pills placed in pairs between the waveguide extension members and the electrodes to prevent discharge breakdown. In the exemplary embodiment, the electrical insulators 25 are pill-shaped, however, many shaped solids are possible such as slab shaped or washer shaped with one or more holes positioned in the insulator. The front waveguide extension members 22a and 22b can be either individual parts, as shown in FIGS. 1A and 12, or can be part of a single part sharing a common portion 22c, as shown in FIG. 13.

Waveguide extension members are separated by the anti-breakdown gap from the electrodes bounding a discharge region in order to avoid unwanted discharge breakdown either between the waveguide extension members themselves or between the waveguide extension members and electrodes, or between the waveguide extension members. Discharge breakdown will not occur at a given pressure over a certain minimum distance according to Paschen's Law, which specifies a minimum separation for breakdown. See, for example, A. von Engel, "*Ionized Gases*", American Institute of Physics Press, Woodbury, N.Y., 1994, p. 195.

Contrary to conventional approaches, the present invention incorporates inexpensive metallic parts into waveguide extension members to provide waveguiding surfaces between gaseous or solid-state gain medium, such as found in the resonator cavity 26, and laser optical elements, such as the front and rear resonator mirrors 16 and 18. For example, at least one of the metals listed in Table 3, or their alloys, could be used in fabricating portions of the waveguide extension members. In the depicted embodiment, the ceramic spacer pills 25 extend about 2 to 3% of the distance between the first and second electrodes 12 and 14 and one of the front and rear resonator mirrors 16 and 18, whereas the front waveguide extension members 22a and 22b and the rear waveguide extension members 24a and 24b extend over 80% of the distance. In other embodiments, the ceramic spacer pills 25 can extend to 10% or more of the distance between the first and second electrodes 12 and 14 and one of the front and rear resonator mirrors 16 and 18, and the front waveguide extension members 22a and 22b and the rear waveguide extension members 24a and 24b can extend less than 75% of the distance, but using greater extension of the ceramic spacer pills may not be as cost effective.

TABLE 3

TABLE OF MATERIAL FOR THE EXTENDERS

| Material | Description |
| --- | --- |
| Metals | Metals including those listed below and all their alloys could be used: Aluminum (including 2000, 3000, 6000, 7000 series), Copper, Gold, Silver, Platinum, Nickel, Chromium, Zinc, Molybdenum, Tantalum, Iron, Titanium, Tin Paladium, Vanadium, Scandium, Magnesium, Tin, Brass, Lead |

Figure 14:
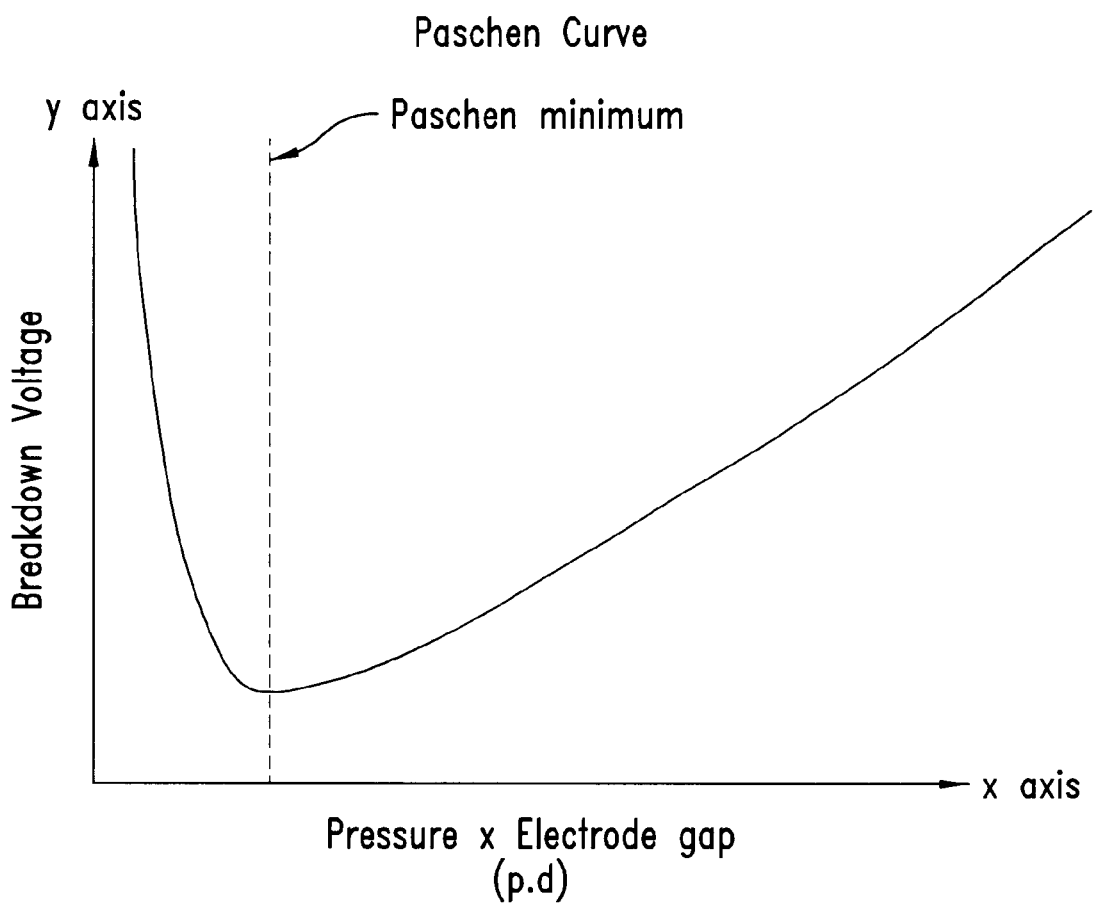
FIG. 14 is a plot illustrating Paschen's law behavior for breakdown voltage versus gas medium pressure×electrode gap.

A generalized Paschen Law plot of voltage required to produce a plasma, known as the breakdown voltage, is plotted along the y-axis of the plot in FIG. 14 versus the product of gas pressure and anti-breakdown gap distance between electrodes and waveguide extension members or other electrodes (e.g. z-axis dimension of spacer pills 25 in FIG. 1A) along the x-axis of the plot in FIG. 14 to illustrate the dependencies that the breakdown voltage has with respect to anti-breakdown gap distance and gas pressure. The shape of a Paschen Law plot for a particular gas mixture will be somewhat dependent upon the gas composition of the mixture. For the depicted embodiment, sufficient data was not available to construct a detailed Paschen Law plot, so the 0.38 mm anti-breakdown gap distance used for the z-axis dimension of the spacer pills 25 was arrived at through experimentation.

Improvements may be made if the Paschen Law plot were known for the particular gas mixture involved. As the generalized Paschen Law plot shows in FIG. 14, on the left of the vertical dotted line (Paschen minimum) the amount of voltage required to produce a plasma rapidly increases for a decreasing product of pressure multiplied by anti-breakdown gap distance. For instance, a gas mixture having a pressure of 80 Torr typically has a large breakdown voltage for an anti-breakdown gap distance between waveguide extension members and electrodes smaller than 0.5 mm or an anti-breakdown gap distance greater than 6 mm. For 80 Torr gas mixtures, the Paschen minimum exists somewhere between 0.5 mm and 6 mm where breakdown voltage is relatively low and plasmas are relatively easy to form. The depicted embodiment has an anti-breakdown gap distance between the waveguide extension members and electrodes of 0.38 mm for a gas pressure of 90 torr. An anti-breakdown gap distance smaller than 0.38 mm was not used in the depicted embodiment to lessen manufacturing tolerances and avoid the risk of accidentally electrically coupling an electrode to a waveguide extension member.

Figure 15:
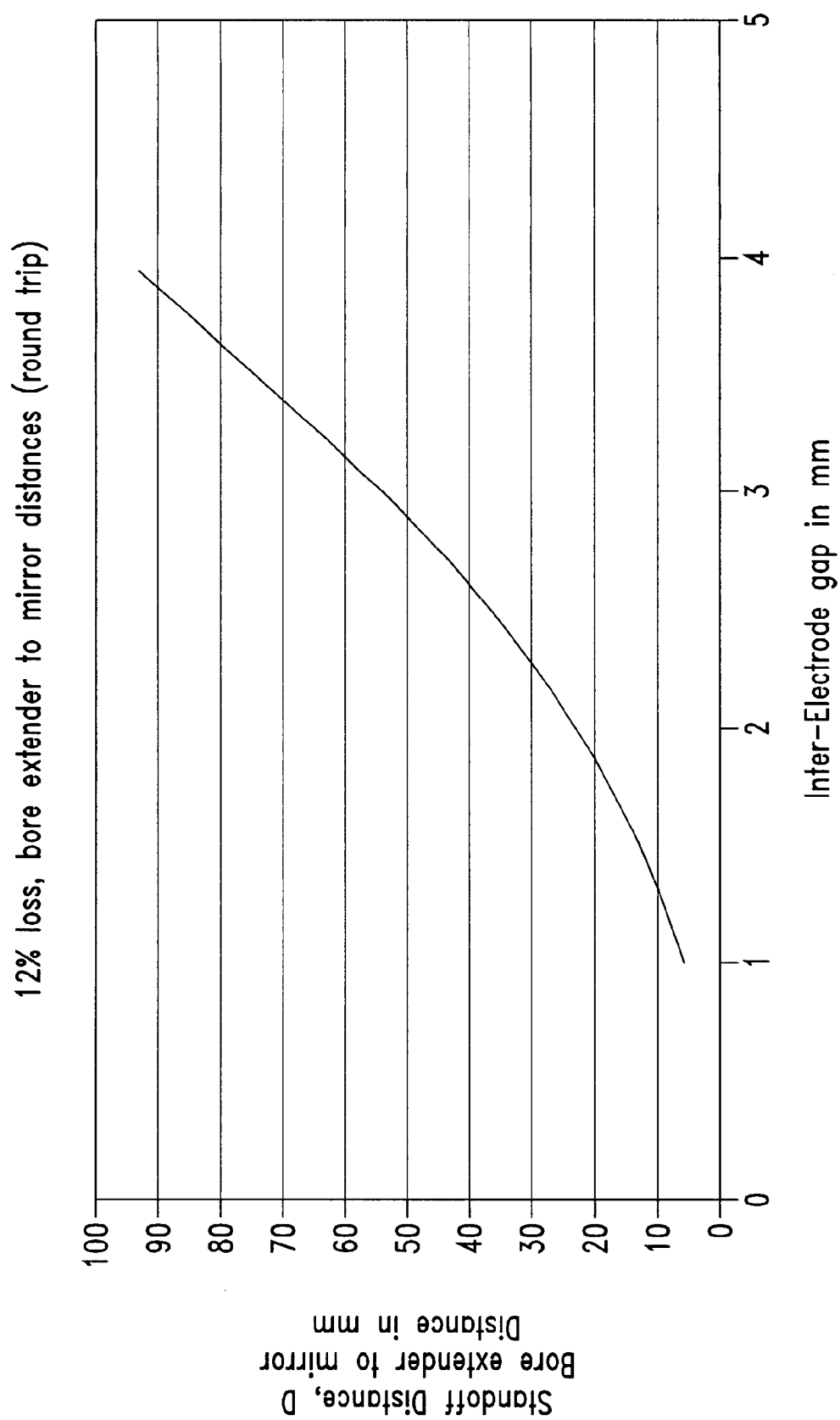
FIG. 15 is a generalized plot of stand-off distance versus inter-electrode gap for a 12% power loss in a laser beam.

A stand-off distance, D, shown in FIG. 1A between the front waveguide extension members 22a and 22b and the front mirror 16 was selected as approximately 2.0 mm for the depicted embodiment. A similar stand-off distance exists between the rear waveguide extension members 24a and 24b and the rear mirror 18. The stand-off distance, D, allows for adjustments in positioning and alignment of the front and rear mirrors 16 and 18 and also allows for manufacturing tolerances without causing significant losses in power of the laser beam 20. FIG. 15 shows a plot of stand-off distance, D, versus inter-electrode gap for a 12% power loss in non-gain portions of the resonator cavity 26 that are not bounded by the first and second electrodes 12 and 14 experienced by the laser beam 20 traveling a round trip within the laser 10 by reflecting once off of the front mirror 16 and reflecting once off of the rear mirror 18. Power loss occurs in the non-gain regions of the resonator cavity 26 (in portions not bounded by the first and second electrodes 12 and 14) and on the front and rear extension portions 22c' and 24c' of the solid-state crystal 34 since the laser beam 20 is not being amplified in these regions. The 12% power loss associated in FIG. 15 is a sum of each percentage loss experienced by the laser beam 20 for each non-gain region based upon the energy content of the laser beams entering the non-gain region and the energy content of the laser beam leaving the non-gain region. This 12% power loss level is an upper limit with respect to what would be acceptable for the depicted embodiment.

Figure 16A:
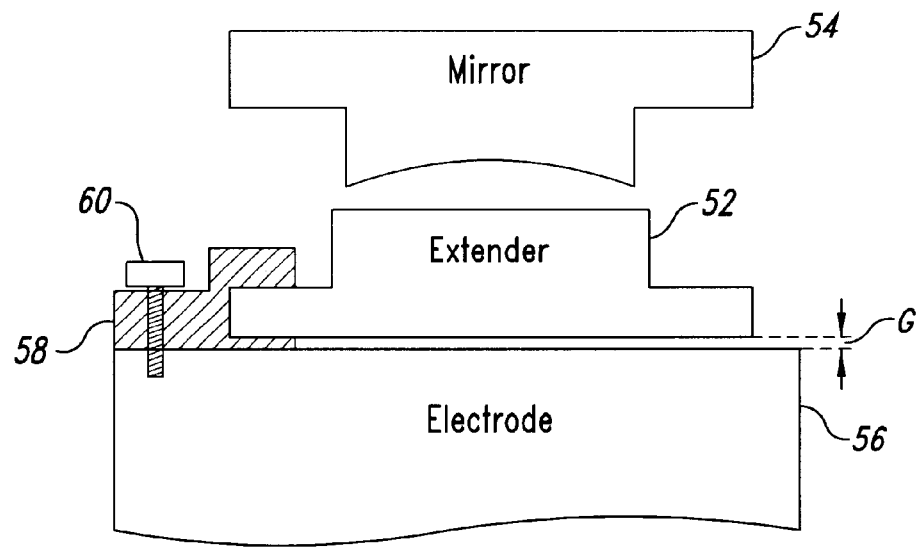
FIGS. 16A and 16B are a longitudinal cross-sectional views of alternative embodiments of the present invention illustrating the use of different types of clamps to secure the waveguide extension member.
Figure 16B:
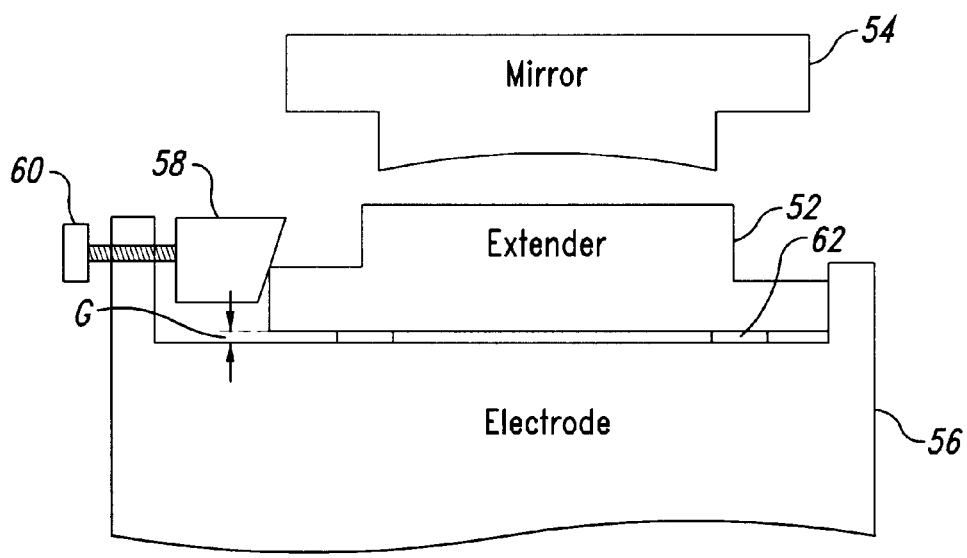

Although the waveguide extension members have been described to be fastened to the electrode portions of the invention through the use of ceramic screws and electrical insulators, other embodiments of the invention may utilize alternative fastening structures. For instance, FIG. 16 depicts an alternative embodiment wherein the waveguide extension member 52 is fastened to a longitudinal end of an electrode 56 by a clamp 58 and is positioned at a desired distance from an optical mirror 54. The clamp 58 is directly fastened to the longitudinal end of the electrode 56 by a screw 60, typically made of metal, glass, or plastic that extends through the clamp into the electrode. The clamp 58, in turn, secures the waveguide extension member 52 by clasping a portion of the waveguide extension member and maintaining the anti-breakdown gap, G, from the electrode 56. The clamp 58 could include any of the ceramic materials listed in Table 2. In other embodiments, the clamp 58 could be made of other electrically insulating materials such as glass or plastic, examples of which are also noted in Table 2. In alternative embodiments, one of which is shown in FIG. 16B, the clamp 58 and the screw 60 can be shaped and positioned in other configurations to secure the waveguide extension member 52. Also, shown in FIG. 16B, electrically insulating spacers 62 can be added to assist in positioning the waveguide extension member 52 relative to the electrode 56 to provide the anti-breakdown gap.

Figure 17:
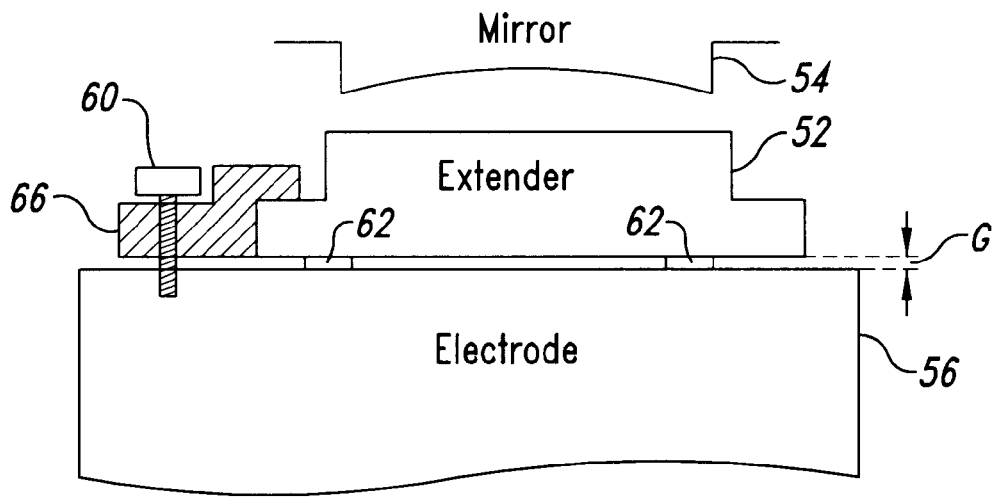
FIG. 17 is a longitudinal cross-sectional view of an alternative embodiment of the invention depicted in FIG. 16 wherein electrically insulating spacers are used to maintain a desired gap distance.

Another alternative fastening structure is shown in FIG. 17 using a ceramic clamp 66, the screw 60, and the electrically insulating spacers 62. In this embodiment of the invention, the ceramic clamp 66 is directly fastened to the longitudinal end of the electrode 56 through the use of the screw 60. The ceramic clamp also secures a portion of the waveguide extension member 52. The electrically insulating spacers 62 are positioned between the waveguide extension member 52 and the the electrode 56 as to maintain the anti-breakdown gap, G, between the waveguide extension member and the electrode. The ceramic clamp 66 could be alternatively comprised of a glass material or a plastic material. The electrically insulating spacers could be comprised of materials such as ceramic, glass, or plastic, examples of which have been mentioned previously.

Figure 18:
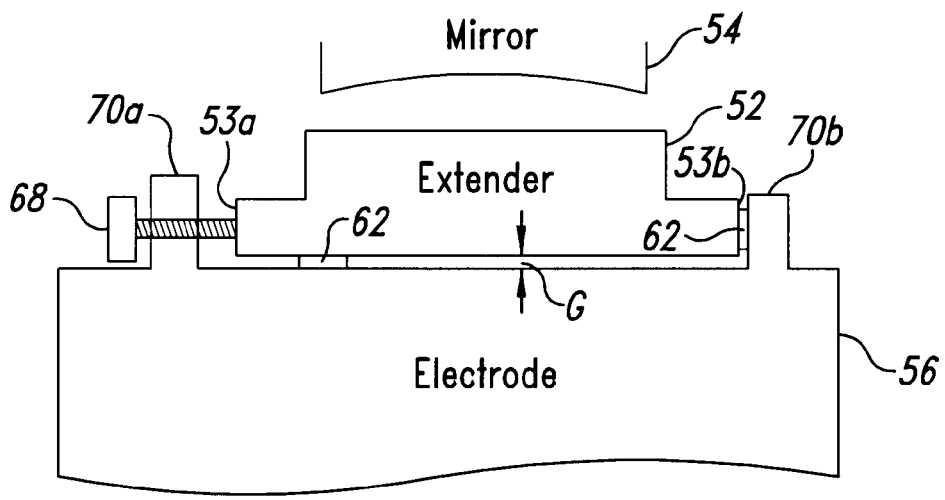
FIG. 18 is a longitudinal cross-sectional view of an alternative embodiment of the present invention illustrating the use of a securing screw and electrically insulating spacers to fasten the waveguide extension member and maintain a desired gap distance.

An embodiment of the invention that utilizes a securing screw 68 and the electrically insulating spacers 62 to secure the waveguide extension member 52 by the anti-breakdown gap, G, from the electrode 56 is shown in FIG. 18. The securing screw 68 pierces a first protruding end portion 70a of the electrode 56 and directly contacts a first side portion 53a of the waveguide extension member 52. The securing screw 68 affixes a second side portion 53b of the waveguide extension member 52 against a second protruding end portion 70b of the electrode 56. Secured between the second protruding end portion 70b of the electrode 56 and the second side portion of the waveguide extension member 52 is as least one of the electrically insulating spacers 62. More of the electrically insulating spacers 62 may be positioned between the waveguide extension member 52 and the longitudinal end of the electrode 56 in order to maintain the anti-breakdown gap, G. The electrically insulating spacers 62 may be comprised of ceramic, plastic, or glass materials. The securing screw 68 may also be comprised of suitable electrically insulating materials, such as ceramic, glass, or plastic.

Figure 19:
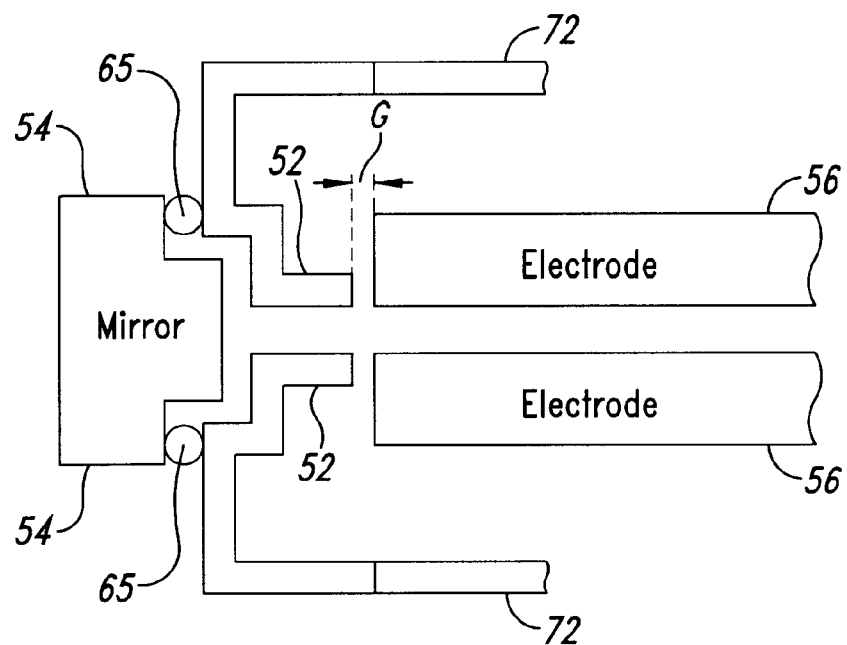
FIG. 19 is a longitudinal cross-sectional view of an alternative embodiment of the present invention depicting the waveguide extension members as being extensions of a laser housing.

In an alternative embodiment of the invention, the waveguide extension members 52 could be formed from portions of a housing 72 used to provide vacuum integrity and radio frequency radiation shielding, as shown in FIG. 19. In this embodiment, portions of the housing 72 can be extended to form the waveguide extension members 52. The waveguide extension members 52 are maintained at the anti-breakdown gap, G, from the electrodes 56 and are also separated from the mirror 54 in some suitable fashion. FIG. 19 shows round spacers 65 positioned between the waveguide extensions members 52 and the mirror 54. The housing 72 and, therefore, the waveguide extension members 52 are also electrically insulated from the electrodes 56.

Figure 20:
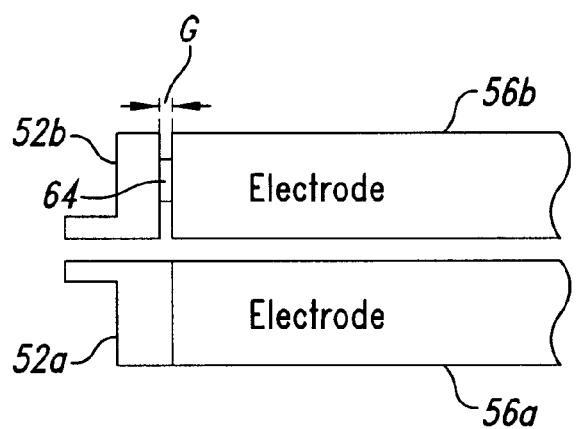
FIG. 20 is a longitudinal cross-sectional view of an alternative embodiment of the present invention wherein a waveguide extension member is directly attached to a grounded electrode.

Other embodiments of the invention, which utilize a grounded electrode, can include a waveguide extension member that is directly fastened to the grounded electrode, an example of such an embodiment being shown in FIG. 20. A first waveguide extension member 52a directly contacts and is fastened to a longitudinal end of a grounded electrode 56a by any suitable means, such as metallic or non-metallic screw. A second waveguide extension member 52b is maintained by the anti-breakdown gap, G, from a longitudinal end of a second electrode 56b through the use of any of the suitable structures described above. An electrically insulating spacer 64, positioned between the second waveguide extension member 52b and the longitudinal end of the second electrode 56b, may also be used to maintain the desired gap distance G.

Comparison tests have shown that the laser 10 with the described waveguide extension members produced 36% more output power (82 W versus 60 W) compared with a similar control laser, but without waveguide extension members. Additionally, the laser 10 with waveguide extension members displayed an output power stability of ±5% versus ±16% for the control laser without waveguide extension members. For the laser 10 of the embodiment of FIG. 1, there was an estimated sevenfold reduction in power loss due to optical losses when the waveguide extension members were used. Without the waveguide extension members the control laser experienced approximately a 14% loss in power due to optical losses whereas approximately less than 2% of power was lost due to optical losses when the waveguide extension members were used with the laser 10. Furthermore, it was found that qualitatively, the resonator structure was much easier to align and much less sensitive to misalignments.

The reduced losses realized by use of the waveguide extension members results in increased output power, improved power stability, better alignment sensitivity and less expense. Reduced losses also implies cooler optics, which are less prone to damage over extended periods of use. The waveguide extension members help to stabilize power output by reducing the effect of mirror tilts caused by heating and thermal effects by being able to couple more power back into the inter-electrode region.

From the foregoing it will be appreciated that, although specific embodiments of the invention have been described herein for the purposes of illustration, various modifications may be made without deviating from the spirit and scope of the invention. Accordingly, the invention is not limited except as by the appended claims.

It is claimed:

1. A laser comprising:

first and second electrodes extending in a longitudinal direction and each having opposing first and second longitudinal ends, at least portions of the first and second electrodes being separated from each other in a separation direction transverse to the longitudinal direction by a separation distance associated with a Fresnel number of no more than 0.75;

a gaseous lasing medium disposed between the first and second electrodes, the gaseous lasing medium configured to form laser energy when excited by excitation energy from an energy source transmitted through the first and second electrodes, the gaseous medium being at an operating pressure;

first and second mirrors, the first mirror being positioned adjacent to the first longitudinal ends of the first and second electrodes and the second mirror being positioned adjacent to the second longitudinal ends of the first and second electrodes, the first and second mirrors having surfaces configured to form the laser energy into a laser beam that extends between the first and second mirrors;

a plurality of electrical insulators comprising one or more solid materials; and first and second waveguide extensions, the first waveguide extension being positioned at the first longitudinal ends of the first and second electrodes with at least one of the electrical insulators therebetween and extending in the longitudinal direction toward the first mirror, and the second waveguide extension being positioned at the second longitudinal ends of the first and second electrodes with at least one of the electrical insulators therebetween and extending in the longitudinal direction toward the second mirror, the first and second waveguide extensions being electrically conducting, each of the first and second waveguide extensions having opposing surfaces separated from each other along the separation direction by substantially the separation distance, the electrical insulators being sized along the longitudinal direction according to Paschen's law to prevent electrical discharge from occurring between the first electrode and the first waveguide extension, between the first electrode and the second waveguide extension, between the second electrode and the first waveguide extension, between the second electrode and the second waveguide extension, between the opposing surfaces of the first waveguide extension, and between the opposing surfaces of the second waveguide extension at the operating pressure of the gaseous lasing medium.

2. The laser of claim 1 wherein the first and second waveguide extensions each extend to a predetermined length in the longitudinal direction based upon the separation distance and a predetermined total loss in energy in non-gain regions between the first and second mirrors not bounded by the first and second electrodes to be experienced by the laser beam after traveling round trip between the first and second mirrors.

3. The laser of claim 2 wherein the laser beam has a percentage loss in energy for each non-gain region based upon the energy content of the laser beam entering the non-gain region and the energy content of the laser beam leaving the non-gain region, and wherein the predetermined loss in energy is the sum of the percentage losses in energy of the laser beam for each of the non-gain regions, the predetermined loss in energy being no more than 12%.

4. The laser of claim 1 wherein the electrical insulators are ceramic.

5. The laser of claim 4 wherein the ceramic material includes, but is not limited to, at least one of the following compounds:

barium boride, boron nitride, titanium oxide, calcium boride, chromium nitride, zirconium oxide, titanium diboride, silicon nitride, chromium carbide, aluminum oxide, titanium carbide, magnesium oxide, silicon carbide, and silicon oxide.

6. The laser of claim 1 wherein the electrical insulators are comprised of at least one of the following compounds:

polytetrafluoroethylene, polycarbonate, high density polyethylene, polyamide, polyoxymethylene, polyamide-imide, borosilicate, silica, soda lime, alkali barium, and potash soda lead.

7. The laser of claim 1 wherein the first waveguide extension is positioned at the first longitudinal ends of the first and second electrodes by a fastening screw, the fastening screw being connected to both the waveguide extension and the first longitudinal end of the first electrode.

8. The laser of claim 7 wherein the fastening screw is comprised of at least one of the following electrically insulating materials:

barium boride, boron nitride, titanium oxide, calcium boride, chromium nitride, zirconium oxide, titanium diboride, silicon nitride, chromium carbide, aluminum oxide, titanium carbide, magnesium oxide, silicon carbide, silicon oxide, polytetrafluoroethylene, polycarbonate, high density polyethylene, polyamide, polyoxymethylene, polyamide-imide, borosilicate, silica, soda lime, alkali barium, and potash soda lead.

9. The laser of claim 1 wherein the first waveguide extension is secured by a clamp, the clamp also being fastened to the first longitudinal end of the first electrode.

10. The laser of claim 1, further comprising a housing configured to enclose the gaseous medium, the first waveguide extension being formed from a portion of the housing.

11. The laser of claim 1 wherein the waveguide extensions comprise one or more of the following:

aluminum, copper, brass, stainless steel, gold, silver, chromium, zinc, molybdenum, tantalum, iron, titanium, tin palladium, vanadium, scandium, magnesium, tin, lead, and platinum.

12. The laser of claim 1 wherein each of the waveguide extensions comprise a pair of extenders, each extender having one of the opposing surfaces.

13. The laser of claim 12 wherein each of the pair of extenders of each of the waveguide extensions are separate pieces and remain unjoined by a common member.

14. The laser of claim 12 wherein the pair of extenders for each waveguide extension are joined together by a common member.

15. The laser of claim 1 wherein the gaseous lasing medium includes at least one of the following:
carbon dioxide, neon, carbon monoxide, hydrogen, krypton, argon, fluorine, deuterium, oxygen, cadmium, strontium, and vapors of copper, gold, strontium, barium, a halide compound of copper, a halide compound of gold, a halide compound of strontium, a halide compound of barium, sulfur, silicon, iodine, bromine, and chlorine.

16. A laser comprising:
first and second electrodes extending in a longitudinal direction and each having an opposing longitudinal end, at least portions of the first and second electrodes being separated from each other in a separation direction transverse to the longitudinal direction by a separation distance associated with a Fresnel number of no more than 0.75;
a gaseous lasing medium disposed between the first and second electrodes, the gaseous lasing medium configured to form laser energy when excited by excitation energy from an energy source transmitted through the first and second electrodes, the gaseous medium being at an operating pressure;
a mirror being positioned adjacent to the longitudinal end of the first and second electrodes, the mirror having a surface configured to contribute in forming the laser energy into a laser beam that extends from the mirror along the longitudinal direction;
a plurality of electrical insulators comprising one or more solid materials; and
a waveguide extension, the waveguide extension being positioned at a same one of the longitudinal ends of each of the first and second electrodes with at least one of the electrical insulators therebetween and extending in the longitudinal direction toward the mirror, the waveguide extension being electrically conducting and having opposing surfaces separated from each other along the separation direction by substantially the separation distance, the electrical insulators being sized along the longitudinal direction according to Paschen's law to prevent electrical discharge from occurring between the first electrode and the waveguide extension, between the second electrode and the waveguide extension, and between the opposing surfaces of the waveguide extension at the operating pressure of the gaseous lasing medium.

17. A laser comprising:
a discharge space bounded by first and second elongated walls extending in a longitudinal direction between first and second longitudinal ends, at least portions of the first and second elongated walls being separated by at least one structural member from each other in a separation direction transverse to the longitudinal direction by a separation distance associated with a Fresnel number of no more than 0.75;
a lasing medium disposed within the discharge space, the lasing medium configured to form laser energy when excited by excitation energy from an energy source;
first and second mirrors, the first mirror being positioned adjacent to the first longitudinal end of the discharge space, and the second mirror being positioned adjacent to the second longitudinal end of the discharge space, the first and second mirrors having surfaces configured to form the laser energy into a laser beam that extends between the first and second mirrors;
a first electrical insulator comprising one or more solid materials and extending longitudinally from a proximal end of the first longitudinal end of the discharge space and terminating in a distal end toward the first mirror;
a first waveguide extension being electrically conducting and extending longitudinally from the distal end of the first electrical insulator and terminating at a location toward the first mirror;
a second electrical insulator being a solid and extending longitudinally from a proximal end at the second longitudinal end of the discharge space and terminating in a distal end toward the second mirror; and
a second waveguide extension being electrically conducting and extending longitudinally from the distal end of the second electrical insulator and terminating at a location toward the second mirror, the first and second waveguide extensions each having opposing surfaces separated from each other along the separation direction by substantially the separation distance.

18. The laser of claim 10 wherein each of the first and second elongated walls have ends, wherein each of the waveguide extensions comprise two members, and wherein the first and second electrical insulators comprise insulator pieces, each member of one of the waveguide extensions being linked to one of the ends of the first and second walls with an insulator piece therebetween.

19. A laser comprising:
a discharge space being elongated in a longitudinal direction, in a second direction transverse to the longitudinal direction, at least a portion of the discharge space having a second direction thickness associated with a Fresnel number of no more than 0.75, the discharge space having opposing first and second longitudinal ends;
first and second mirrors positioned toward the opposing longitudinal ends of the discharge space;
a first waveguide extension member and a second waveguide extension member being electrically conducting and being spaced adjacent to the first opposing longitudinal end of the discharge space and separated therefrom by gap distances smaller than a minimum breakdown gap distance according to Paschen's law, the minimum breakdown gap distance being that spacing distance between a closest one of the first and second waveguide extension members and the first opposing end of the discharge space that allows for a minimum voltage between the first and second waveguide extension members and the discharge space to cause an electrical discharge therebetween, the first waveguide extension member and the second waveguide extension member extending longitudinally toward the first mirror and being separated from each other in the second direction by substantially the second direction thickness of the discharge space; and
a third waveguide extension member and a fourth second waveguide extension member being electrically conducting and being spaced adjacent to the second opposing longitudinal end of the discharge space and separated therefrom by gap distances smaller than the minimum breakdown gap distance, the third waveguide extension member and the fourth waveguide extension member extending longitudinally toward the second mirror and being separated from each other in the second direction by substantially the second direction thickness of the discharge space.

20. A laser comprising:

at least first and second discharge spaces, the first discharge space being elongated in a first longitudinal direction and the second discharge space being elongated in a second longitudinal direction, the first and second discharge spaces each having a common second direction transverse to the respective first and second longitudinal directions, at least a portion of each discharge space having a thickness in the second direction associated with a Fresnel number of no more than 0.75, each of the first and second discharge spaces having a longitudinal end with the longitudinal ends of the first and second discharge spaces facing toward each other; and a waveguide extension member positioned between the longitudinal ends of the first and second discharge spaces, the waveguide extension member being spaced from the longitudinal end of each of the first and second discharge spaces by gap distances smaller than a minimum breakdown gap distance according to Paschen's law, the minimum breakdown gap distance being that spacing distance between the waveguide extension member and the adjacent one of the first and second discharge spaces that allows for a minimum voltage therebetween to cause an electrical discharge between the waveguide extension member and the adjacent discharge space, the waveguide extension member extending between the longitudinal ends of the first and second discharge spaces, the waveguide extension member having opposing surfaces separated from each other in the second direction by substantially the thickness of the discharge space.

21. A laser comprising:

first and second mirrors opposingly positioned along a longitudinal axis, the first and second mirrors having surfaces configured to form energy into a laser beam that extends between the first and second mirrors;

an energy source to supply excitation energy;

at least one electrically non-conductive insulator; and a solid-state crystal having a mid-portion being a solid-state gain media and elongated along the longitudinal axis, the mid-portion having a thickness in a dimension traverse to the longitudinal axis associated with a Fresnel number of no more than 0.75, the solid-state crystal having a first portion with substantially the thickness in the dimension of the mid-portion and extending from the mid-portion toward the first mirror, the solid-state crystal having a second portion with substantially the thickness in the dimension of the mid-portion and extending from the mid-portion toward the second mirror, the mid-portion being linked to the energy source to receive excitation energy, the first and second portions configured to remain unlinked by the at least one electrically non-conductive insulator to the suorcec to receive subtantially no excitation energy.

22. A laser comprising:

first and second electrodes extending in a longitudinal direction and each having opposing first and second longitudinal ends;

the first electrode being electrically coupled to an electrical ground;

a gaseous lasing medium disposed between the first and second electrodes, the gaseous lasing medium configured to form laser energy when excited by excitation energy from an energy source transmitted through the first and second electrodes;

first and second mirrors, the first mirror being positioned adjacent to the first longitudinal ends of the first and second electrodes and the second mirror being positioned adjacent to the second longitudinal ends of the first and second electrodes;

at least one electrical insulator comprising one or more solid materials; and first and second waveguide extensions, the first waveguide directly contacting the first longitudinal end of the first electrode and extending in the longitudinal direction toward the first mirror, and the second waveguide extension being positioned at the second longitudinal ends of the first and second electrodes with at least one of the electrical insulators therebetween and extending in the longitudinal direction toward the second mirror, the first and second waveguide extensions being electrically conducting, each of the first and second waveguide extensions having opposing surfaces separated from each other, the electrical insulators being sized to prevent electrical discharge from occurring between the first electrode and the second waveguide extension, between the second electrode and the second waveguide extension, and between the opposing surfaces of the second waveguide extension.

23. A method of providing a laser, the method comprising:

providing first and second electrodes having first and second longitudinal ends being extended in a longitudinal direction;

providing a separation of at least portions of the first and second electrodes in a separation direction transverse to the longitudinal direction by a separation distance associated with a Fresnel number of no more than 0.75;

providing a gaseous lasing medium being at an operating pressure and disposed between the first and second electrodes to form laser energy when excited by excitation energy;

providing first and second mirrors positioned toward opposing longitudinal ends of the first and second electrodes, the first and second mirrors having surfaces configured to form the laser energy into a laser beam that extends between the first and second mirrors;

providing first and second waveguide extensions;

positioning by structurally securing within the laser the first waveguide extension near the first longitudinal end of the first and second electrodes, the first waveguide extension being positioned to extend longitudinally toward the first mirror;

positioning by structurally securing within the laser the second waveguide extension near the second longitudinal end of the first and second electrodes, the second waveguide extension being positioned to extend longitudinally toward the second mirror;

structurally securing the first and second waveguide extensions within the laser to maintain a separation of opposing surfaces of the first waveguide extension from each other and opposing surfaces of the second waveguide extension from each other along the separation direction by substantially the separation distance; and positioning by structurally securing within the laser a plurality of electrical insulators comprising one or more solid materials between the first electrode and the first waveguide extension, between the first electrode and the second waveguide extension, between the second electrode and the first waveguide extension, between the second electrode and the second waveguide extension, between the opposing surfaces of the first waveguide extension, and between the opposing surfaces of the second waveguide extension at the operating pressure of the gaseous lasing medium to prevent electrical discharge from occurring between the first or second waveguide extension and the first or second electrode according to Paschen's law.

24. A method of making a laser, the method comprising:

providing first and second electrodes, each having first and second longitudinal ends;

structurally securing the first and second electrodes within the laser to extend the first and second electrodes in a longitudinal direction and to separate at least portions of the first and second electrodes in a separation direction transverse to the longitudinal direction by a separation distance associated with a Fresnel number of no more than 0.75;

providing a gaseous lasing medium;

disposing the gaseous lasing medium being at an operating pressure between the first and second electrodes to form laser energy when excited by excitation energy;

providing first and second mirrors;

structurally securing the first mirror within the laser to position the first mirror toward the first longitudinal ends of the first and second electrodes;

structurally securing the second mirror within the laser to position the second mirror toward the second longitudinal ends of the first and second electrodes;

providing electrical insulators comprising one or more solid materials;

connecting at least one of the electrical insulators to each of the first and second longitudinal ends of each of the first and second electrodes to extend the electrical insulators connected to one of the first longitudinal ends of one of the first and second electrodes longitudinally a predetermined thickness toward the first mirror and to extend the electrical insulators connected to one of the second longitudinal ends of one of the first and second electrodes longitudinally a predetermined thickness toward the second mirror;

providing waveguide extension members being electrically conducting;

linking one of the waveguide extension members to each of the first and second longitudinal ends of each of the first and second electrodes by connecting the waveguide extension members to the electrical insulators to extend the waveguide extension members linked to one of the first longitudinal ends of the first and second electrodes toward the first mirror, to extend the waveguide extension members linked to one of the second longitudinal ends of the first and second electrodes toward second mirror, to separate the waveguide extension members that extend to the first mirror from each other along the separation direction by substantially the separation distance, and to separate the waveguide extension members that extend to the second mirror from each other along the separation direction by substantially the separation distance; and sizing according to Paschen's law the predetermined thickness of each of the electrical insulators to prevent electrical discharge from occurring between the first electrode and the waveguide extension members linked to the first electrode, the second electrode and the waveguide extension members linked to the second electrode, and between the waveguide extension members themselves given the operational pressure of the gaseous lasing medium.

25. A method of operating a laser, the method comprising:

maintaining a gaseous medium at an operating pressure, the gaseous medium being disposed between electrodes, one or more portions of one or more of the electrodes being separated from one or more portions of one or more other of the electrodes in a separation direction by a separation distance associated with a Fresnel number of no more than 0.75;

exciting the gaseous medium in one or more discharge spaces bounded by the electrodes with excitation energy to form laser energy when excited by the excitation energy;

forming the laser energy into a laser beam using first and second mirrors, the laser beam extending between the first and second mirrors in one or more directions transverse to the separation direction; and waveguiding the laser beam with respect to the separation direction by using other electrically conducting structures for portions of non-discharge spaces being spaces other than the one or more discharge spaces and by using the electrodes for the one or more discharge spaces, each of the other electrically conducting structures extending at least 75% of the distance between one of the one or more discharge spaces and one of the first and second mirrors.

26. The method of claim 18 wherein waveguiding the laser beam further includes waveguiding such that the laser beam has no more than a 12% total reduction in energy content in the non-discharge spaces for a round trip between the first and second mirrors.

27. A laser comprising:

an energy providing means for providing a first energy;

a lasing means for converting the first energy into a lasing energy;

a contact means for receiving the first energy and for imparting the first energy to the lasing means;

first and second reflecting means for forming the lasing energy into a laser beam, the contact means additionally for waveguiding the laser beam with respect to a first direction;

one or more extension means for waveguiding the laser beam with respect to the first direction in one or more areas outside waveguiding by the contact means; and means for electrically isolating the one or more extension means for waveguiding from the contact means to prevent electrical discharge according to Paschen's law.

28. A laser comprising:

an energy providing means for providing a first energy;

a discharge space;

a lasing medium, a portion of the lasing medium occupying the discharge space and configured to convert the first energy into a lasing energy;

first and second mirrors configured to form a laser beam from the lasing energy, the laser beam traveling between the first and second minors, the discharge space sized to have a thickness in a first dimension to waveguide the laser beam traveling through the discharge space;

a first end space bounded by the first mirror and the discharge space;

a second end space bounded by the second mirror and the discharge space;

a first means for waveguiding the laser beam over 75% of travel by the laser beam through the first end space and a second means for waveguiding the laser beam over 75% of travel by the laser beam through the second end space; and a means for electrically insulating the first and second means for waveguiding from the energy providing means for providing a first energy.

* * * * *